United States Patent
Wang

(10) Patent No.: US 8,970,670 B2
(45) Date of Patent: Mar. 3, 2015

(54) METHOD AND APPARATUS FOR ADJUSTING 3D DEPTH OF OBJECT AND METHOD FOR DETECTING 3D DEPTH OF OBJECT

(75) Inventor: Chien Shun Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 518 days.

(21) Appl. No.: 13/300,840

(22) Filed: Nov. 21, 2011

(65) Prior Publication Data

US 2012/0127269 A1 May 24, 2012

(30) Foreign Application Priority Data

Nov. 23, 2010 (TW) ................................ 99140295 A

(51) Int. Cl.
*H04N 13/00* (2006.01)
(52) U.S. Cl.
CPC .......... *H04N 13/004* (2013.01); *H04N 13/007* (2013.01)
USPC ........................................................ 348/43
(58) Field of Classification Search
USPC ........................................................ 348/43
See application file for complete search history.

(56) References Cited

U.S. PATENT DOCUMENTS

| | | | | |
|---|---|---|---|---|
| 6,360,027 B1* | 3/2002 | Hossack et al. | ............... | 382/294 |
| 2006/0244866 A1* | 11/2006 | Kishida | .................... | 348/699 |
| 2011/0050847 A1* | 3/2011 | Sasaki et al. | .................... | 348/42 |
| 2011/0122227 A1* | 5/2011 | Kim | ................................ | 348/43 |
| 2011/0149036 A1* | 6/2011 | Suh et al. | ......................... | 348/43 |
| 2011/0304691 A1* | 12/2011 | Newton et al. | .................. | 348/43 |

FOREIGN PATENT DOCUMENTS

WO 2010064118 A1 6/2010

\* cited by examiner

*Primary Examiner* — Dave Czekaj
*Assistant Examiner* — Tracy Li
(74) *Attorney, Agent, or Firm* — Edell, Shapiro & Finnan, LLC

(57) ABSTRACT

A method for adjusting three-dimensional (3D) depth including performing block matching on left-eye/right-eye frames of a stereo video signal to generate a motion vector of a specific object and to obtain 3D depth of the specific object; and adjusting 3D depth of an additive object according to that of the specific object, wherein the additive object is one of a subtitle object, an on screen display (OSD) object or a program guide object.

10 Claims, 5 Drawing Sheets

METHOD AND APPARATUS FOR ADJUSTING 3D DEPTH OF OBJECT AND METHOD FOR DETECTING 3D DEPTH OF OBJECT

CROSS REFERENCE TO RELATED PATENT APPLICATION

This patent application is based on Taiwan, R.O.C. patent application No. 099140295 filed on Nov. 23, 2010.

FIELD OF THE INVENTION

The present invention relates to an approach for detecting three-dimensional (3D) depth of a primary object and dynamically adjusting 3D depth of an additive object of a stereo video signal, and more particularly, to a method and apparatus thereof capable of performing block matching on left-eye/right-eye frames of a stereo video signal to calculate a motion vector and thereby detect 3D depth of a primary object, and adjust 3D depth of an additive object according to the detected 3D depth of the primary object.

BACKGROUND OF THE INVENTION

FIG. 5 shows a schematic diagram of a structure of an image frame 500 of a current 3D stereo video signal. In the image frame 500, P1 represents an image object closest to human eyes, i.e., a stereo video object having lowest 3D depth, P2 represents an image object farthest from the human eyes, i.e., a stereo video object having deepest 3D depth, P3 indicates a position of an additive object (e.g., a subtitle object). Taking a current stereo film signal as an exampling, its subtitle object is located at fixed positions (e.g., 3D depth) in different frames, and the fixed 3D depth is normally very low. However, 3D depth of the primary image object or a primary scene in different frames of the stereo film signal dynamically changes. When 3D depth of a subtitle (e.g., P3) of a certain frame is significantly different from that of its primary image object or its primary scene (e.g., P2), a focal length needs to be continuously changed since human eyes cannot focus on a same location. In such situation, observation of such type of images for a long time easily tires or fatigues human eyes, and thus reducing quality and pleasure of observing the stereo video. Accordingly, there is a need for a technique for dynamically detecting 3D depth of a stereo image and dynamically adjusting 3D depth of an additive object (e.g., a subtitle) according to the 3D depth of the stereo image.

SUMMARY OF THE INVENTION

Therefore, one object of the present invention is to provide a method and apparatus thereof capable of detecting 3D depth of a primary image object or a primary scene of a stereo video signal so as to address the foregoing problem.

More specifically, an object of the present invention is to provide a method and apparatus thereof capable of dynamically adjusting 3D depth of an additive object according to detected 3D depth of a primary image object or a primary scene so as to address the human eye fatigue issue explained above.

According to an embodiment of the present invention, a method for adjusting 3D depth of an object is provided to dynamically adjust 3D depth of an additive object of a stereo video signal. The method comprises detecting 3D depth of a specific object in a plurality of frames of a stereo video signal; and adjusting the 3D depth of the additive object according to that of the specific object.

According to another embodiment of the present invention, a method for detecting 3D depth of an object is provided to detect 3D depth of a specific object of a stereo video signal. The method comprises performing block matching on a left-eye frame and a right-eye frame of a stereo video signal to generate a motion vector corresponding to the specific object; and obtaining 3D depth of the specific object according to the motion vector.

According to yet another embodiment of the present invention, an apparatus is provided to dynamically adjust 3D depth of an additive object of a stereo video signal. The apparatus comprises a calculating circuit, for detecting 3D depth of a specific object in a plurality of frames of the stereo video signal; and an adjusting circuit, for adjusting the 3D depth of the additive object according to that of the specific object.

DETAILED DESCRIPTION OF THE PREFERRED EMBODIMENT

Figure 1:
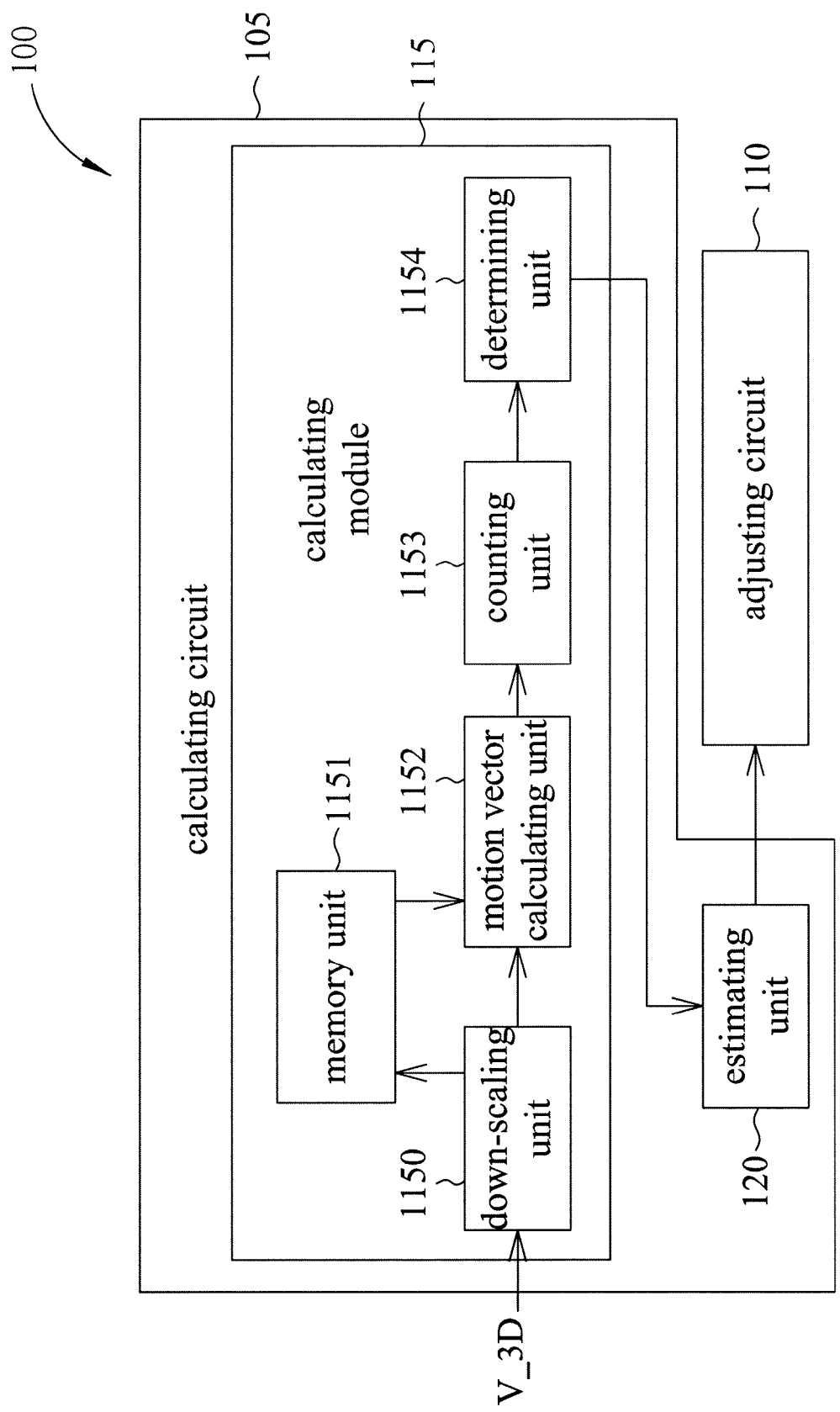
FIG. 1 shows a block diagram of an apparatus for adjusting 3D depth of an additive object of a stereo video signal in accordance with an embodiment of the present invention.

FIG. 1 shows a block diagram of an apparatus 100 for adjusting 3D depth of an object in accordance with an embodiment of the present invention. The apparatus 100 for dynamically adjusting 3D depth of an additive object of a stereo video signal V_3D comprises a calculating circuit 105 and an adjusting circuit 110. The calculating circuit 105 detects 3D depth of a specific object in a plurality of frames of the stereo video signal V_3D, and the adjusting circuit 110 coupled to the calculating circuit 105 adjusts the 3D depth of the additive object according to the detected 3D depth of the specific object. More specifically, the additive object can be a subtitle object, an on screen display (OSD) object, a program guide object or other objects with images or characters. In this embodiment, the subtitle object is taken as an example to explain operations of the apparatus 100; however, it shall not be construed as limiting the present invention. In addition, the stereo video signal V_3D is a video data stream, of a 3D stereo image, conforming to a format of stereo video, i.e., the stereo video signal V_3D comprises a plurality of left-eye and right-eye frames. In this embodiment, the 3D depth represents Z axis information of the stereo image or object of the stereo video signal V_3D, and the specific object may refer to an image region of a primary image object or a primary scene within an image range (i.e., an image region formed by a plurality of image blocks). The specific object is a maximum or a relatively bigger image range compared to other objects of a frame, e.g., in a certain stereo film frame, an image region where a principal actor is located serves as the specific object. In addition, the plurality of frames comprises at least two image frames—a left-eye frame and a right-eye frame, and a viewer obtains a stereo perception of the specific object of the stereo video signal V__3D after having observed the left-eye and right-eye frames.

The calculating circuit 105 comprises a calculating module 115 and an estimating unit 120. The calculating module 115 performs block matching on the left-eye and right-eye frames to calculate a motion vector corresponding to the specific object, and then the estimating unit 120 estimates the 3D depth of the specific object according to the motion vector of the specific object. More specifically, the calculating module 115 comprises a down-scaling unit 1150, a memory unit 1151, a motion vector calculating unit 1152, a counting unit 1153, and a determining unit 1154. The down-scaling unit 1150 performs horizontal scale down (HSD) and/or vertical scale down (VSD) on image data of each frame of the stereo video signal V__3D to generate a down-scaled image frame so as to reduce calculation burden on subsequent circuits. In practical applications, the down-scaling unit 1150 performs image scaling via a sampling or averaging approach. The down-scaled image frame is output to the memory unit 1151 and the motion vector calculating unit 1152, respectively. Since the memory unit 1151 buffers the received image frame, the motion vector calculating unit 1152 receives two adjacent image frames at one time point, i.e., one left-eye frame and one right-eye frame. However, the left-eye and right-eye frames shall not be construed as liming the present invention. The motion vector calculating unit 1152 performs block matching on the left-eye and right-eye frames to calculate a plurality of motion vectors respectively corresponding to a plurality of image hocks within a frame range. It is to be noted that, since the left-eye frame and the right-eye frame only have differences in the horizontal direction due to human eye left-eye/right-eye visual characteristics, the motion vector calculating unit 1152 may only perform block matching in the horizontal direction, but not involving the vertical direction or other direction, so that calculation processing is reduced to avoid using unnecessary amounts of resources. In other words, the motion vectors calculated by the motion vector calculating unit 1152 are horizontal motion vectors; however, it shall not be construed as limiting the present invention. In addition, the down-scaling unit 1150 is an optional circuit component, and in other embodiments, the down-scaling unit 1150 can be omitted when image calculating/detecting accuracy is taken into consideration.

Figure 2:
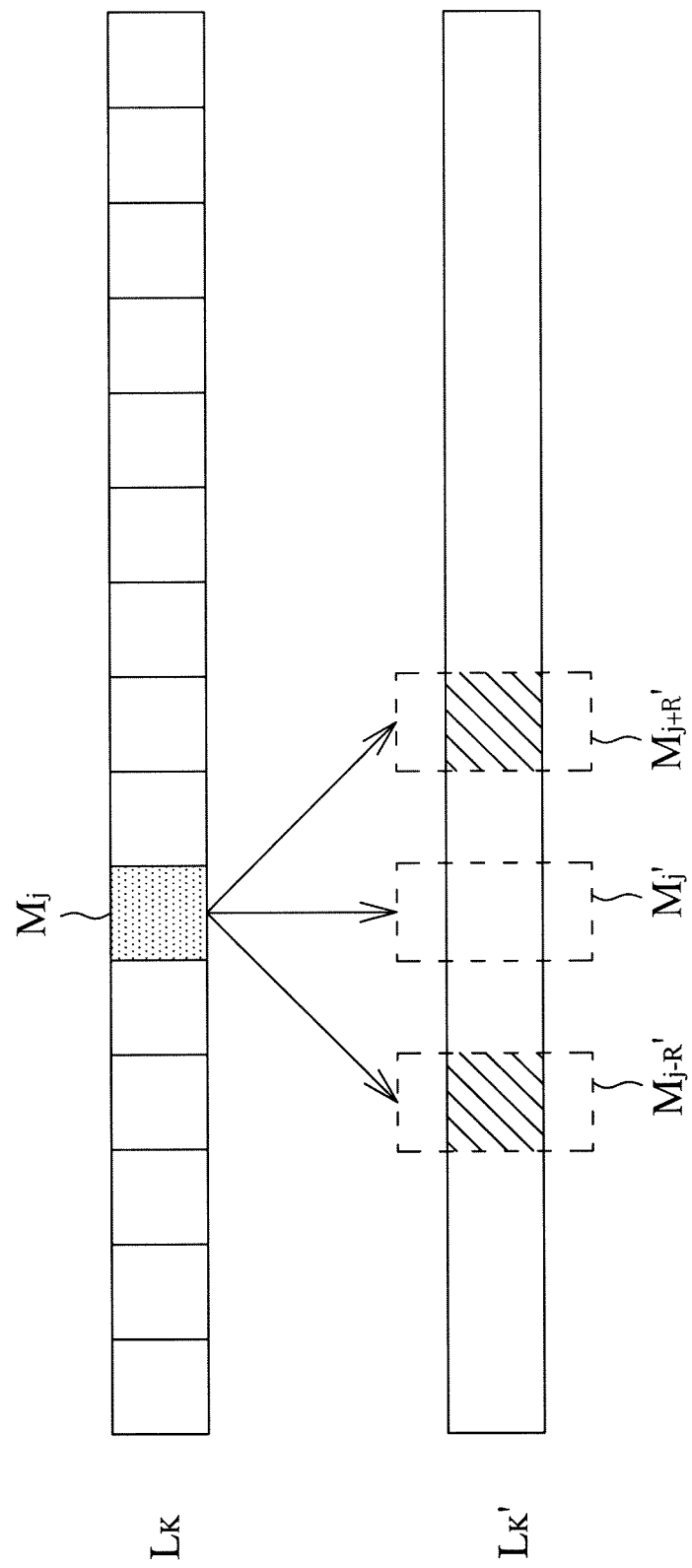
FIG. 2 shows a schematic diagram of block matching operations performed by a motion vector calculating unit shown in FIG. 1.

FIG. 2 shows a schematic diagram of block matching operations performed by the motion vector calculating unit 1152 shown in FIG. 1. The motion vector calculating unit 1152 performs block matching on blocks in each horizontal scan line of a previous frame $F_{n-1}$ and a current frame $F_n$ (or a so-called next frame), where $F_{n-1}$ and $F_n$ are frames observed by different eyes of a viewer. For example, the motion vector calculating unit 1152 performs block matching on a block $M_j$ in a scan line $L_k$ of the previous image frame $F_{n-1}$ and blocks $M_{j-R}'$ to $M_{j+R}'$ (i.e., 2R+1 blocks) in a corresponding scan line $L_k'$ of the current image frame $F_n$ to generate a plurality of block matching values (e.g., sum of absolute differences (SAD)), where k represents a kth scan line, j represents a jth block in the horizontal direction, R is a positive integer, and the block matching values correspond to different horizontal motion vectors. The motion vector calculating unit 1152 selects a minimum block matching difference from the 2R+1 block matching values, and defines a motion vector corresponding to the minimum block matching difference as the motion vector of the block $M_j$. After iterations of the foregoing operations are performed, the motion vector calculating unit 1152 calculates a motion vector corresponding to each block of the previous frame $F_{n-1}$, and the calculated motion vectors serve as reference for determining the 3D depth.

Figure 3:
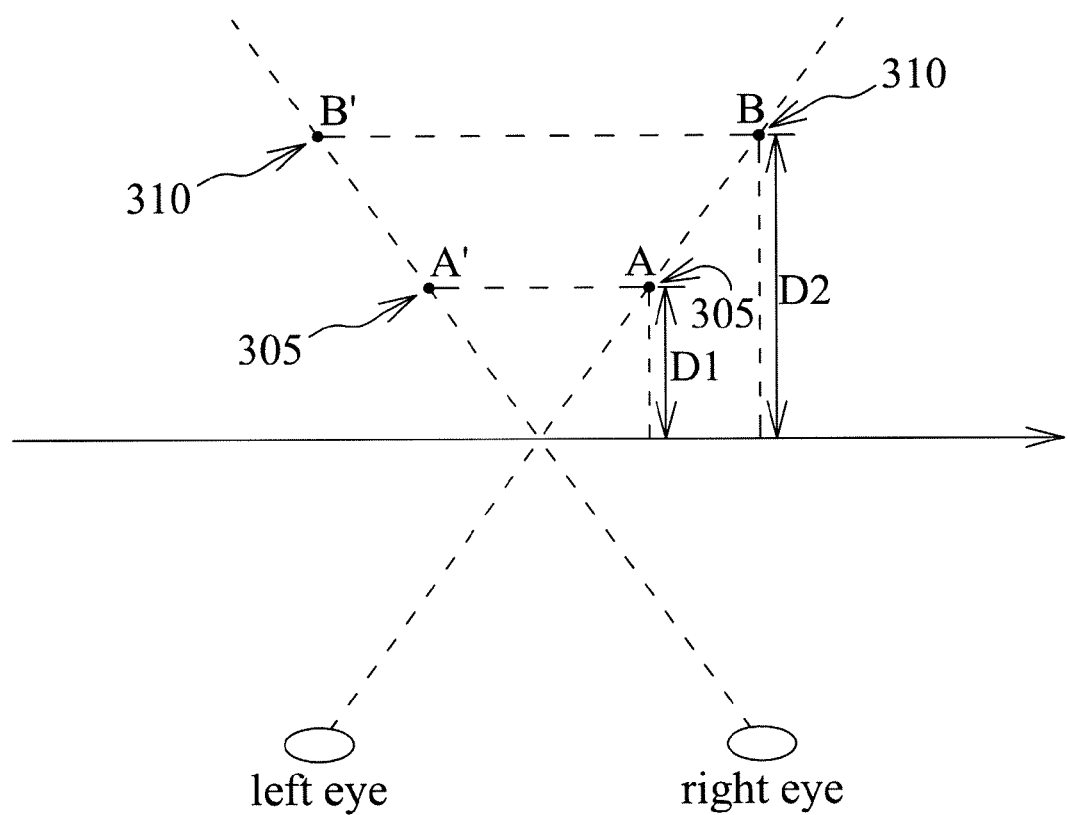
FIG. 3 shows a schematic diagram of a relationship between a motion vector of an image of a left-eye/right-eye frame and 3D depth of the image in accordance with an embodiment of the present invention.

FIG. 3 shows a schematic diagram of a relationship between a motion vector of an image of left-eye/right-eye frames and 3D depth of the image in accordance with an embodiment of the present invention. Taking an image 305 as an example, a left eye of a viewer perceives that the image 305 is located at point A in the left-eye frame, and a right eye of the viewer perceives that the image 305 is located point A' in the right-eye frame, so that the viewer obtains a stereo visual perception of the image 305 having the 3D depth that is represented as D1. In addition, taking an image 310 as an example, the left eye of the viewer perceives that the image 310 is located at point B of the left-eye frame, and the right eye of the viewer perceives that the image 310 is located at point B' of the right-eye frame, so that the viewer also obtains a stereo visual perception of the image 310 having the 3D depth that is represented as D2. Therefore, as observed in FIG. 3, when the 3D depth perceived by the viewer of a stereo image gets deeper, a distance (i.e., shift amount) between horizontal positions of the stereo image located in the left-eye frame and the right-eye frame becomes larger, i.e., the shift amount of the stereo image in the left-eye frame and the right-eye frame is directly proportional to the 3D depth of the stereo image. Since the horizontal position shift amount is represented by a motion vector calculated via block matching of two frames, the motion vector is directly proportional to the 3D depth of the stereo image. Therefore, in this embodiment, the horizontal motion vector of each block calculated by the motion vector calculating unit 1152 according to the left-eye frame and the right-eye frame can serve as reference for determining the 3D depth, so that the adjusting circuit 110 subsequently adjusts the subtitle object to an appropriate 3D depth.

Referring to FIG. 1, after the motion vector calculating unit 1152 has calculated the motion vector corresponding to each block of one frame, the counting unit 1153 counts the number of the motion vectors corresponding to each motion vector value to obtain a specific motion vector having a specific motion vector value. In this embodiment, the counting unit 1153 counts the number of the motion vectors corresponding to each motion vector value, e.g., zero. Accordingly, the counting unit 1153 obtains the number of the motion vectors corresponding to each motion vector value, and the motion vector value corresponding to the maximum number is regarded as the specific motion vector value obtained by the counting unit 1153. In other words, within a frame, an image corresponding to the specific motion vector has a largest area compared to other images corresponding to other motion vectors. Therefore, according to such characteristics, the subsequent determining unit 1154 determines the image block corresponding to the specific motion vector as the primary image object (i.e., the specific object) of the whole frame, so that the plurality of image blocks corresponding to the specific motion vector are defined as an image region corresponding to the specific object, and the motion vector of the specific object is regarded as the specific motion vector value. In this embodiment, the calculating module 115 can determine the primary image object of the frame of the stereo video signal V__3D, and the estimating unit 120 estimates 3D depth of the primary image object according to the value of the motion vector of the primary image object. Therefore, when the 3D depth of the primary image object of the frame is estimated, the adjusting circuit 110 adjusts the additive object (e.g., the subtitle object) to the 3D depth of the primary image object with reference to the estimated 3D depth of the primary image object. Accordingly, the viewer can simultaneously clearly perceive the images of the primary image object and the additive object when observing the frame without changing a focal length. Accordingly, during observation of the stereo images of the stereo video signal V_3D for a long time, the viewer can observe the stereo images more easily without needing to continuously adjust the visual focal length due to the difference between the 3D depth of the primary image object and that of the subtitle object of the image frame.

Figure 4:
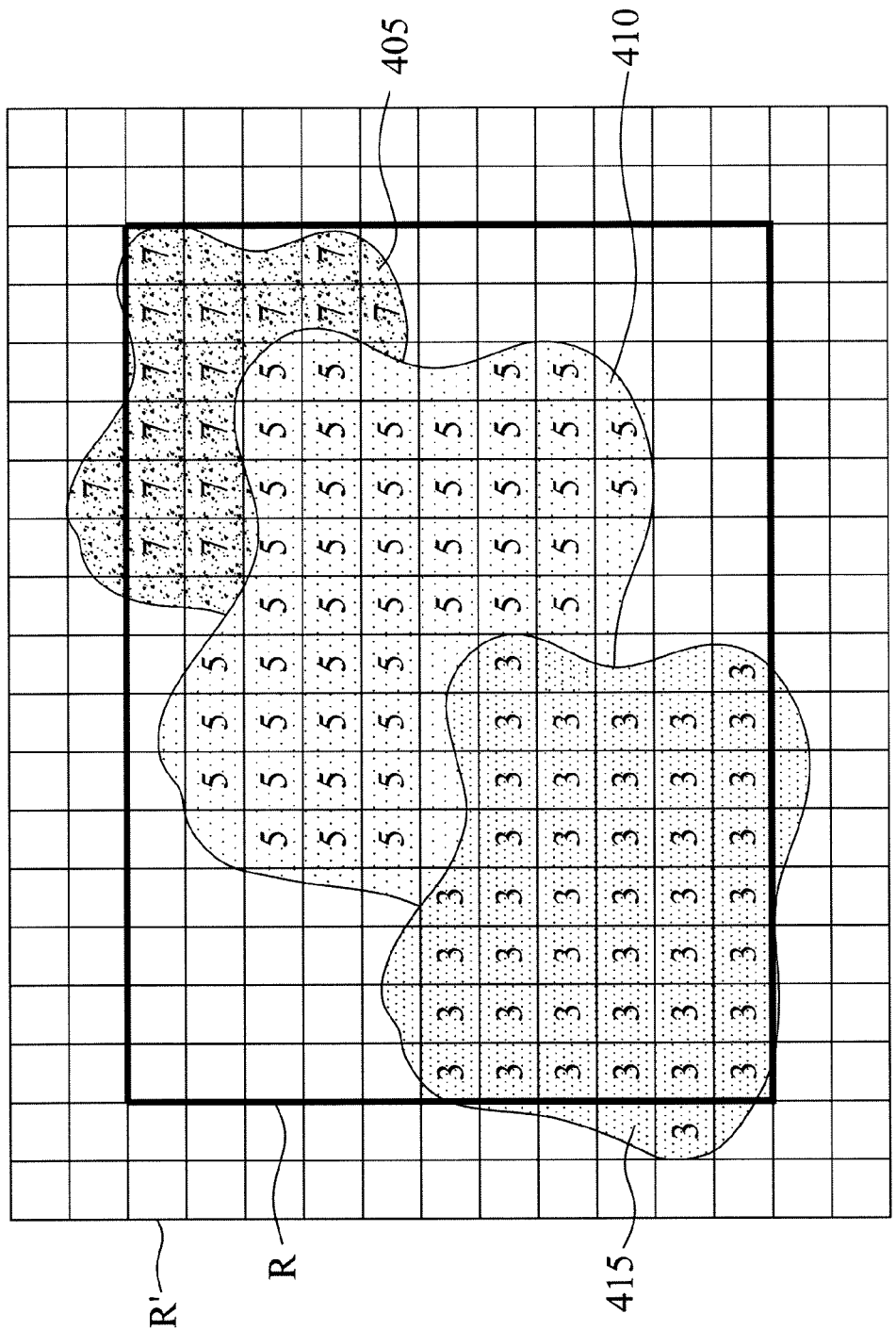
FIG. 4 is a schematic diagram of primary image objects having same 3D depth in accordance with an embodiment of the present invention.
Figure 5:
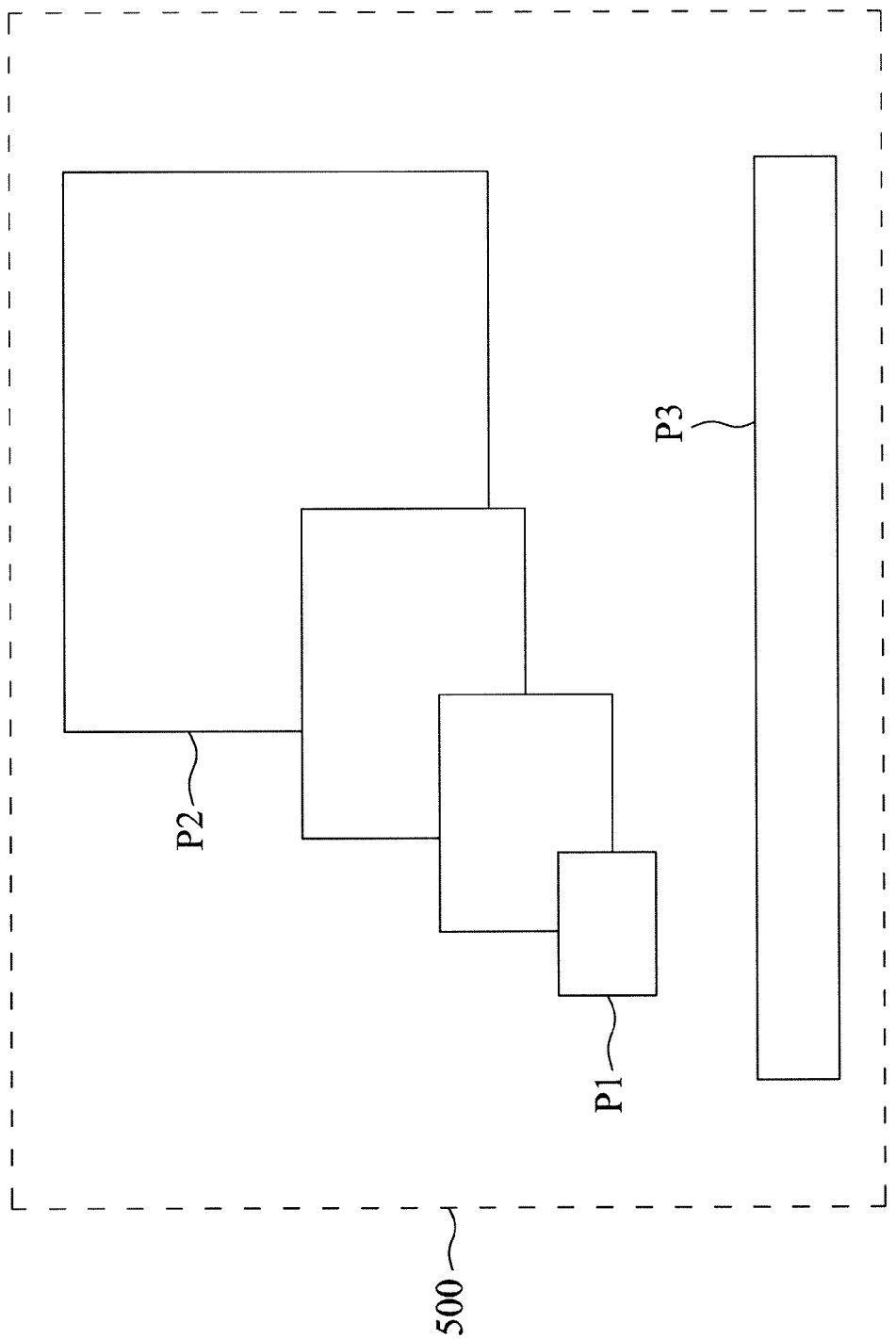
FIG. 5 is a schematic diagram of a structure of an image frame of a current 3D stereo video.

FIG. 4 shows a schematic diagram of primary image objects having same 3D depth in accordance with an embodiment of the present invention. Images within image regions 405, 410 and 415 respectively comprise a plurality of blocks having same 3D depth values "7", "5" and "3". The image region 410 has the maximum number of blocks, i.e., the image within the image block 410 comprises the maximum number of motion vectors having a same motion vector value, so that the calculating module 115 determines the image within the image region 410 as the primary image object of a current frame, and then the estimating unit 120 estimates 3D depth of the image within the image region according to the motion vector value. In an embodiment, the estimating unit 120 directly regards the motion vector value of the motion vector corresponding to the image region 410 as the 3D depth of the image within the image region 410, and the subsequent adjusting circuit 110 adjusts 3D depth of a subtitle object to the 3D depth "5" of the image of the image region 410 with reference to the estimated 3D depth "5". For example, the adjusting circuit 110 adjusts motion vectors of the subtitle object in the left-eye frame and the right-eye frame to be identical to that of the image region 410, so that the subtitle object has the same 3D depth as the image region 410. Accordingly, due to the adjusted 3D depth, the subtitle object becomes a stereo image but not a plane image, thus making observation more pleasing to the eye. In addition, during image production, in order to emphasize movement of the primary image object, the primary image object or the primary scene is located at the central visual frame. Therefore, in another embodiment, the calculating module 115 defines a detection range R of a frame in advance, and the detection range R is smaller than an image range R' of the whole frame. After that, operations of block matching, motion vector calculation and counting and the primary image object determination are performed within the detection range R. That is, when the 3D depth of the primary image object (i.e., the foregoing specific object) in the plurality of frames of the stereo video signal V_3D is within the range R, the calculating circuit 110 detects the 3D depth of the specific object within the detection region R (i.e., regarded as a first image range), at the central frame, of each of the plurality of frames. Each whole frame of the plurality of frames has the image range R' (i.e., regarded as a second image range). The first image range is smaller than the second image range (i.e., R<R').

In addition, in the foregoing embodiments, the primary image object and the 3D depth of the primary image object are determined according to the motion vector value corresponding to the maximum number of motion vectors; however, in other embodiments, the primary image object and the 3D depth of the primary image object can also be determined according to a motion vector value corresponding to a large number of motion vectors. For example, referring to FIG. 4, although not having the motion vector value corresponding to the maximum number of motion vectors, the image region 415 still has a larger number of motion vectors, so that the calculating circuit 105 determines the image region 415 as the primary image object and estimates the corresponding 3D depth. After that, the adjusting circuit 110 adjusts the 3D depth of the subtitle object to the 3D depth "3" of the image of the image region 415, but not to the 3D depth "5" of the image of the image region 410. In other words, the number of the primary image objects of one frame is not limited to only one. For example, assume a certain stereo image includes two actors engaged in dialogue. Images of the two actors can be considered to be two primary image objects of one frame, and 3D depths of the images of the two actors may thus be different from each other. Therefore, after the having been processed by the apparatus 100 provided by this embodiment, an original plane subtitle object becomes a stereo subtitle object, and 3D depth of the subtitle object is dynamically adjusted to the 3D depth of either of the two actors. The 3D depth of the subtitle object may also be appropriately adjusted according to a predetermined rule, and such modifications shall also be within the scope and spirit of the present invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for dynamically adjusting three-dimensional (3D) depth of an additive object of a stereo video signal, comprising:

using a calculating circuit, detecting 3D depth of a specific object in a plurality of frames of the stereo video signal; and using an adjusting circuit, adjusting the 3D depth of the additive object according to the 3D depth of the specific object, wherein the plurality of frames comprises a left-eye frame and a right-eye frame, and the step of detecting the 3D depth of the specific object in the plurality of frames of the stereo video signal comprises:

performing block matching on the left-eye frame and the right-eye frame to generate a motion vector corresponding to the specific object, wherein the block matching is performed only in a horizontal direction; and obtaining the 3D depth of the specific object according to the motion vector, wherein the step of performing block matching on the left-eye frame and the right-eye frame to generate the motion vector corresponding to the specific object comprises:

performing block matching on the left-eye frame and the right-eye frame to respectively generate a plurality of motion vectors corresponding to a plurality of image blocks;

counting the number of the plurality of motion vectors corresponding to each motion vector value to obtain a specific motion vector; and defining an image block corresponding to the specific motion vector as an image region corresponding to the specific object, with the motion vector of the specific object being the specific motion vector.

2. The method as claimed in claim 1, wherein the step of adjusting the 3D depth of the additive object comprises:

adjusting the 3D depth of the additive object to the 3D depth of the specific object.

3. The method as claimed in claim 1, wherein the additive object is one of a subtitle object, an on screen display (OSD) object or a program guide object.

4. The method as claimed in claim 1, wherein a value of the specific motion vector corresponds to the maximum number within the plurality of motion vectors.

5. The method as claimed in claim 1, wherein when a value of the motion vector of the specific object gets larger, the 3D depth of the specific object becomes deeper.

6. An apparatus for dynamically adjusting 3D depth of an additive object of a stereo video signal, comprising:
- a calculating circuit, for detecting 3D depth of a specific object in a plurality of frames of the stereo video signal; and
- an adjusting circuit, for adjusting the 3D depth of the additive object according to the 3D depth of the specific object,
wherein the plurality of frames comprises a left-eye frame and a right-eye frame, and the calculating circuit comprises:
- a calculating module, for performing block matching on the left-eye frame and the right-eye frame to generate a motion vector corresponding to the specific object, wherein the block matching is performed only in a horizontal direction; and
- an estimating unit, for estimating the 3D depth of the specific object according to the motion vector, wherein the calculating module comprises:
- a motion vector calculating unit, for performing block matching on the left-eye frame and the right-eye frame to respectively generate a plurality of motion vectors corresponding to a plurality of image blocks;
- a counting unit, for counting the number of the plurality of motion vectors corresponding to each motion vector value to obtain a specific motion vector; and
- a determining unit, for defining an image block corresponding to the specific motion vector as an image region corresponding to the specific object, with the motion vector of the specific object being the specific motion vector.

7. The apparatus as claimed in claim 6, wherein the adjusting circuit is configured to adjust the 3D depth of the additive object to the 3D depth of the specific object.

8. The apparatus as claimed in claim 6, wherein the additive object is one of a subtitle object, an OSD object or a program guide object.

9. The apparatus as claimed in claim 6, wherein a value of the specific motion vector corresponds to the maximum number within the plurality of motion vectors.

10. The apparatus as claimed in claim 6, wherein when the motion vector value of the specific object gets larger, the estimated 3D depth of the specific object becomes deeper.

* * * * *